United States Patent [19]

Sasamoto et al.

[11] Patent Number: 5,541,785
[45] Date of Patent: Jul. 30, 1996

[54] MAGNETIC DISK APPARATUS WITH IMPROVED POSITIONING CONTROL OF MAGNETIC HEAD

[75] Inventors: Tatsuro Sasamoto; Kazunori Mori, both of Kawasaki, Japan

[73] Assignee: Fujitsu Limited, Japan

[21] Appl. No.: 122,481

[22] Filed: Sep. 27, 1993

[30] Foreign Application Priority Data

Jan. 31, 1992 [JP] Japan ..................................... 4-016186

[51] Int. Cl.⁶ ................................................... G11B 5/596
[52] U.S. Cl. .................... 360/77.05; 360/67; 360/78.140
[58] Field of Search ............................. 360/77.05, 78.14, 360/77.02, 67, 65, 46, 75, 78.04

[56] References Cited

U.S. PATENT DOCUMENTS

| | | | |
|---|---|---|---|
| 4,551,776 | 11/1985 | Roalson | 360/77.02 |
| 5,027,233 | 6/1991 | Berti et al. | 360/77.02 |

FOREIGN PATENT DOCUMENTS

| | | |
|---|---|---|
| 53-95005 | 8/1978 | Japan . |
| 59-117758 | 7/1984 | Japan . |
| 60-7664 | 1/1985 | Japan . |
| 60-138786 | 7/1985 | Japan . |

*Primary Examiner*—Aristotelis M. Psitos
*Assistant Examiner*—James L. Habermehl
*Attorney, Agent, or Firm*—Greer, Burns & Crain, Ltd.

[57] ABSTRACT

A disk storage device includes at least one disk, a head for scanning a principal surface of the disk in a generally radial direction thereof for reproducing a servo control signal in response to a servo pattern that is recorded on the principal surface, a rotary mechanism for moving the head along the principal surface of the disk generally in the radial direction, an amplifier supplied with the servo signal reproduced at the head for amplifying the same with a predetermined gain, a signal processing circuit for extracting first and second positional control signals each having a phase that is offset with respect to the phase of the other positional control signal by 90 degrees, from the servo control signal, a level detection circuit for detecting a head position at which the first and second positional control signals have simultaneously an identical level and further for detecting the level of the first and second positional control signals at the detected head position, a gain control circuit for controlling the gain of the amplifier such that an absolute value of the foregoing level is set to a predetermined value, and a head position control circuit for controlling a driving circuit in response to a combination of the first and second positional control signals, the head position control circuit locating the head on a predetermined recording track based upon a head position in which the first and second positional control signals have the same level simultaneously.

7 Claims, 10 Drawing Sheets

MAGNETIC DISK APPARATUS WITH IMPROVED POSITIONING CONTROL OF MAGNETIC HEAD

TECHNICAL FIELD

The present invention generally relates to magnetic disk storage devices, and more particularly to a hard disk device wherein the positional control of magnetic heads is improved.

Hard disk devices are used extensively as a large capacity, high speed auxiliary storage device of computers. Generally, a typical hard disk device includes a rigid magnetic disk revolved at a high speed and a magnetic head carried on a swing arm for scanning a recording surface of the magnetic disk at a high speed, wherein the magnetic head scans over the recording surface of the magnetic disk generally in a radial direction in response to the rotational motion of the swing arm. Generally, the magnetic disk is revolved at a high speed in the order of several thousand r.p.m., and the magnetic disk achieves the recording and reproduction of information signals in a state that the head is slightly floated from the recording surface of the magnetic disk.

A general hard disk device includes a plurality of magnetic disks mounted upon a common drive hub so as to be revolved simultaneously, and there are provided a plurality of swing arms and corresponding magnetic heads, wherein the plurality of swing arms are formed as a unitary body and are held rotatable about a common rotational axis. As a result, the foregoing magnetic heads on the swing arms scan the corresponding magnetic disks simultaneously.

BACKGROUND ART

Figure 1:
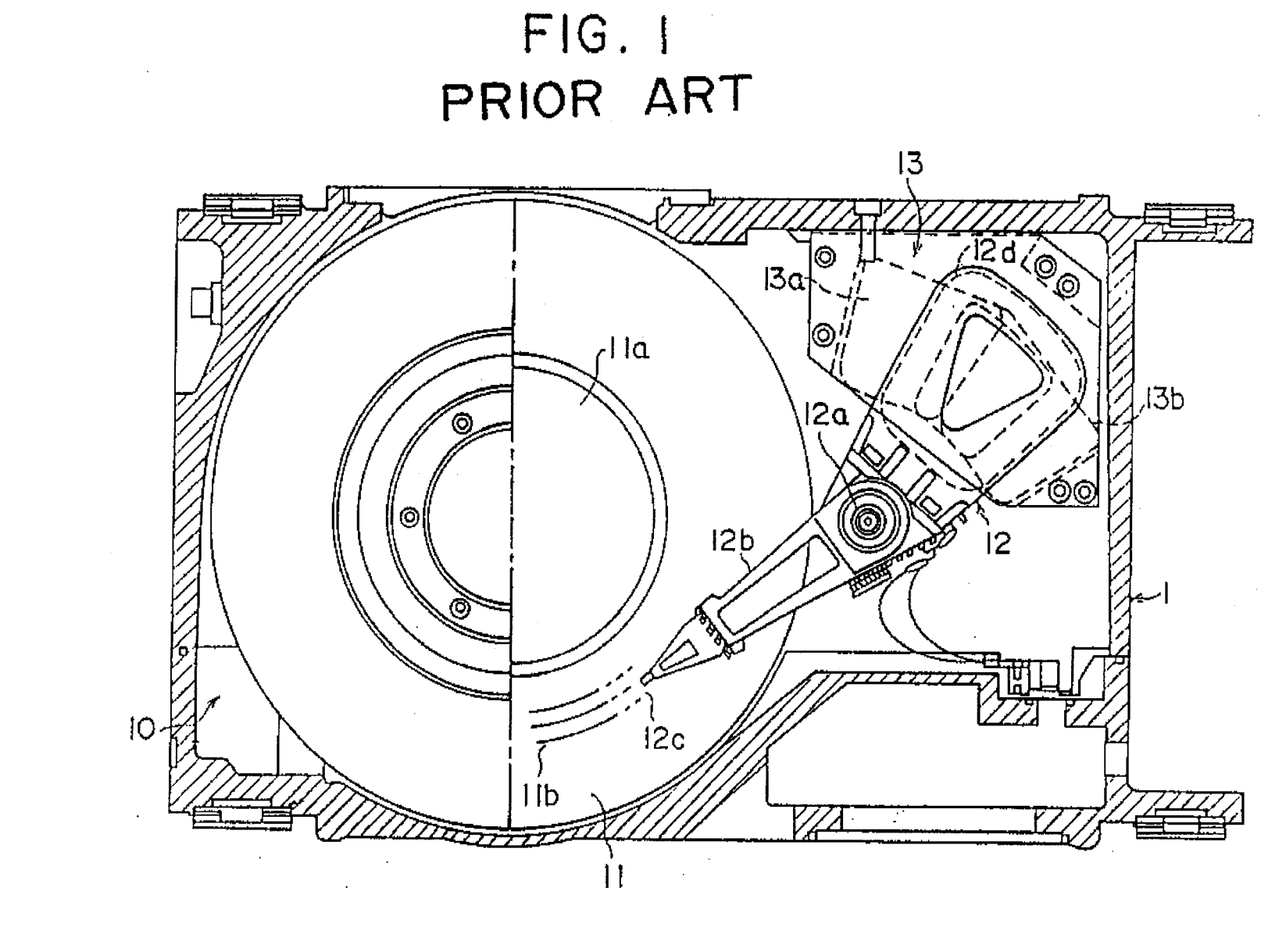
FIG. 1 is a traversal cross sectional diagram showing the construction of a conventional hard disk device.

FIG. 1 shows the internal structure of a conventional hard disk device in a plan view, wherein the left side of a broken line shows the hard disk device in a state wherein the upper cover is removed, while the right side of the broken line shows the construction of a magnetic disk 11 and an arm assembly 12 that cooperates with the disk 11, wherein the magnetic disk 11 and the arm assembly 12 forms a part of a magnetic disk assembly 10 in which a plurality of magnetic disks are stacked with each other.

Referring to FIG. 1, each magnetic disk 11 is mounted upon a hub 11a that is driven by a motor not illustrated, and the arm assembly 12 includes a swing arm 12b held on a swing axle 12a and a magnetic head 12c provided on a free end of the arm 12b. Further, a coil 12d that forms a part of a voice coil motor 13 is provided on the arm 12b in correspondence to another free end, opposite to the first free end on which the magnetic head 12c is provided, wherein the coil 12d is wound parallel to the scanning surface of the arm 12b. Further, magnets 13a and 13b forming another part of the voice coil motor 13 are disposed above and below the coil 12d. Thereby, the arm 12 is rotated about the swing axle 12a freely in response to the energization of the coil 12d. The voice coil motor 13 is subjected to a servo control such that the magnetic head 12c carried on the arm 12b properly tracks a cylinder or track 1b that is defined on the magnetic disk 11.

Figure 2:
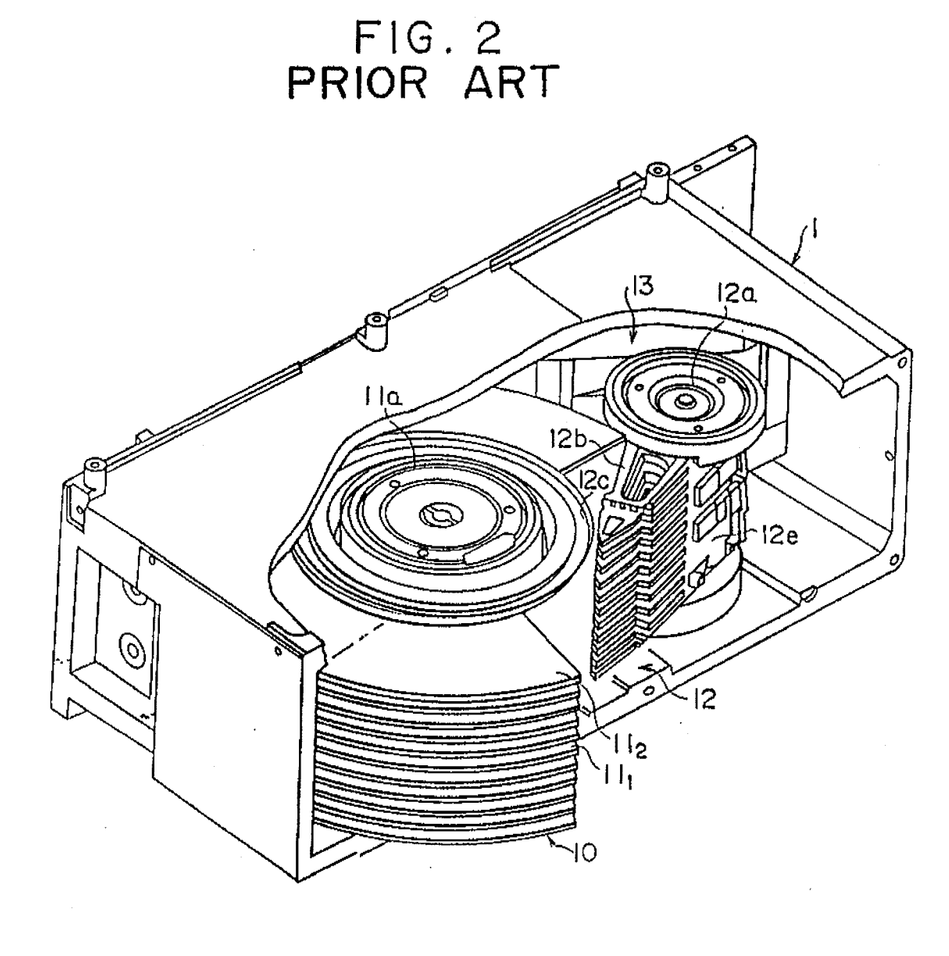
FIG. 2 is a diagram showing the device of FIG. 1 in a state wherein a part thereof is removed.

FIG. 2 is a perspective view showing the internal structure of the hard disk device of FIG. 1.

Referring to FIG. 2, the magnetic disk assembly 10 includes a plurality of magnetic disks $11_1$, $11_2$, . . . that are held commonly on the rotary hub 11a, and the arm assembly 12 includes a plurality of arms corresponding to the plurality of magnetic disks. Each arm 12b is held on a common rotatable member 12e that in turn is held rotatable about the swing axle 12a, and all the arms 12b are swung simultaneously in response to the rotational motion of the member 12e. Of course, the member 12e is activated in response to the energization of the voice coil motor 13. Further, the entire structure of the hard disk device is accommodated within a hermetically sealed envelope 1.

In the hard disk devices having such a construction, one of the stacked magnetic disks such as the magnetic disk $11_1$ is recorded with a servo signal in the form of a magnetization pattern along a cylinder 11b (FIG. 1) that is defined on the magnetic disk. By controlling the magnetic head that cooperates with the magnetic disk $11_1$ to track the foregoing servo signal, other magnetic heads also track the cylinders on the respective, corresponding magnetic disks.

Figure 3:
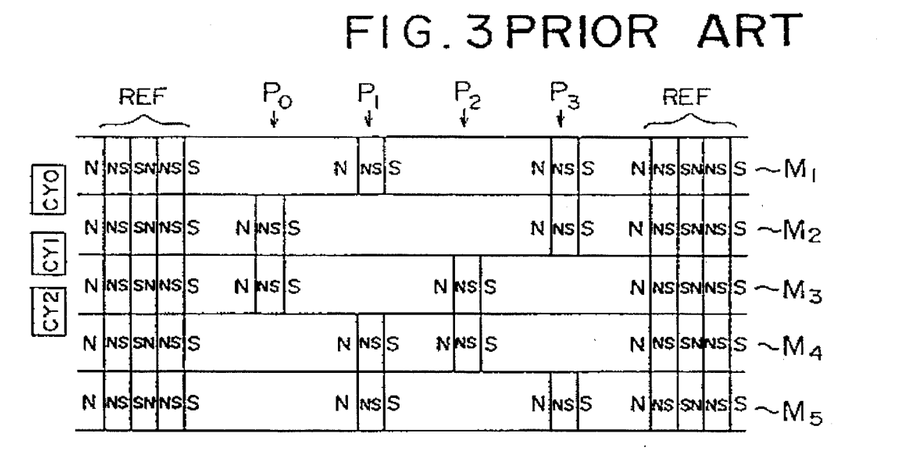
FIG. 3 is a diagram showing a servo pattern formed on a magnetic disk.

FIG. 3 shows an example of the servo control signal recorded on a magnetic disk $11_1$.

Referring to FIG. 3, the servo control signal is recorded in the form of a plurality of concentric magnetic stripes $M_1$, $M_2$, . . . , wherein FIG. 3 shows only a part of the five, consecutive magnetic stripes. It will be noted that the cylinder 11b is formed in correspondence to the boundary between the magnetic stripes $M_1$, $M_2$, . . . as designated as $CY_0$, $CY_1$, $CY_2$, wherein each stripe $M_1$, $M_2$, . . . includes servo patterns $P_0$, $P_1$, $P_2$ and $P_3$ that are formed between two reference patterns REF. It will be noted that reference patterns REF are common in all of the magnetic stripes, while the servo patterns $P_0$–$P_3$ are different in each magnetic stripe. In the illustrated example, the foregoing plurality of reference patterns include an N/S pattern that is repeated three times.

Figure 4:
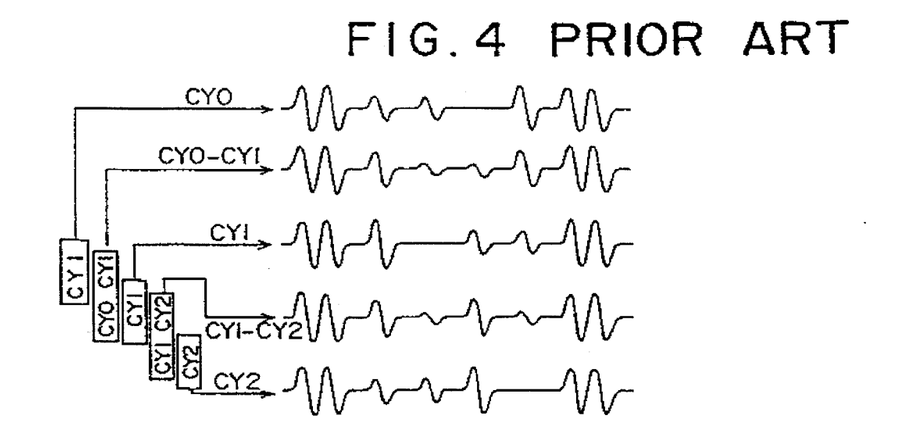
FIG. 4 is a waveform diagram showing the servo signal that is obtained in response to the servo pattern of FIG. 3.

FIG. 4 shows a waveform of the servo signal reproduced by the magnetic head. As will be understood from the drawing, the reproduced servo signal changes depending upon the relative position of the magnetic head with respect to the cylinder. For example, it will be noted that the reproduced signal corresponding to the pattern $P_0$ has a small reproduced level when the magnetic head is located on the cylinder $CY_0$, while the reproduced signal corresponding to the same pattern $P_0$ takes a maximum level when the magnetic head is located on the cylinder $CY_1$.

Figure 5:
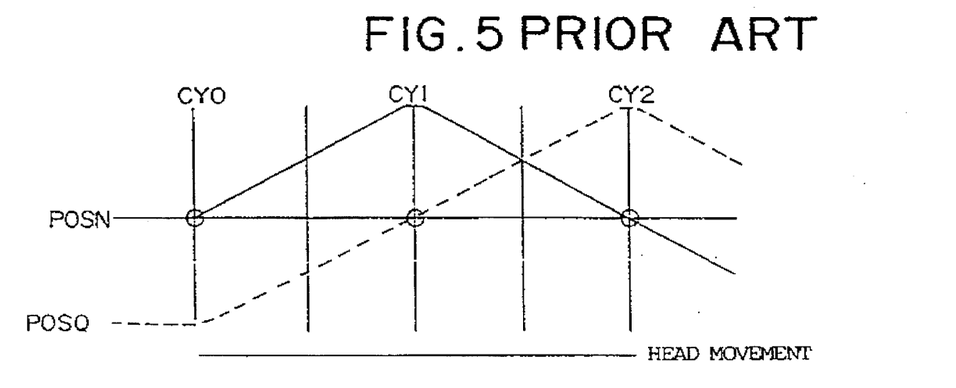
FIG. 5 is a diagram showing head position control signals extracted from the reproduced servo signal of FIG. 4 and having phases that are offset from each other by 90 degrees

FIG. 5 shows the level of two control signals POSN and POSQ extracted from the servo signals reproduced by the foregoing magnetic head, as a function of the relative position of the magnetic head with respect to the cylinders, wherein the signals POSN and POSQ have respective phases that are offset by 90 degrees with each other. The drawing indicates that one can determine the relative position of the magnetic head with respect to the three cylinders $CY_0$, $CY_1$ and $CY_2$ from the peak position of the signal POSN or POSQ.

Figure 6:
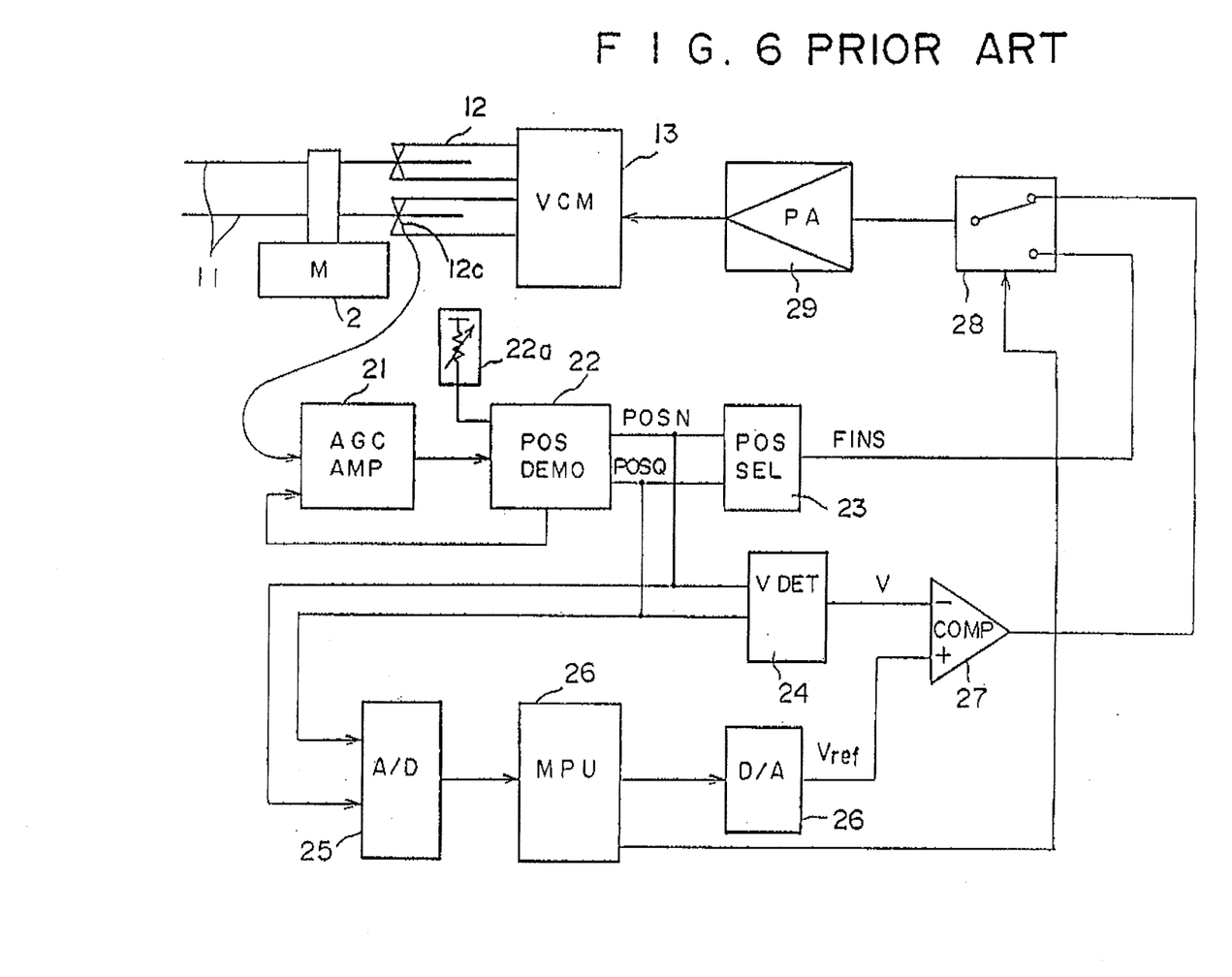
FIG. 6 is a block diagram showing the construction of a conventional magnetic head position control circuit.

FIG. 6 is a block diagram of a control circuit used in the conventional hard disk device for positioning the magnetic head in accordance with the principle of FIG. 5.

Referring to FIG. 6, the servo signal reproduced by a magnetic head 12c is subjected to a gain control process in an AGC amplifier 21 such that the servo signals reproduced from the cylinders at an outer peripheral part of the magnetic disk have substantially the same gain as the servo signals reproduced from the cylinders at an inner peripheral part of the magnetic disk. The servo signals thus processed are supplied to a demodulator circuit 22, wherein the demodulator circuit 22 produces the foregoing two control signals POSN and POSQ having the respective phases that are offset from each other by 90 degrees, based upon the servo signals thus reproduced. Further, the demodulator circuit 22 produces a feedback signal based upon the level of the control signals POSN and POSQ and supplies the same to an AGC amplifier 21. The circuit 22 includes a resistor 22a for adjusting the amount of feedback of the foregoing feedback signal, and the AGC amplifier 21 achieves the foregoing gain adjustment based upon the feedback signal.

The control signals POSN and POSQ thus demodulated at the demodulator circuit 22 are then supplied to a selection circuit 23, wherein the selection circuit 23 extracts the linear part of the POSN and POSQ signals indicated in FIG. 5. Thereby, when the magnetic head 12c is located on the even number cylinders, the selection circuit 23 extracts the linear part of the POSN signal and outputs the same as a fine control signal FINS, while when the head 12c is located on the odd number cylinders, the switch circuit 23 extracts the linear part of the POSQ signal and outputs the same as the fine control signal FINS.

The control signals POSN and POSQ demodulated at the demodulation circuit 22 is then subjected to a differentiation at a speed detection circuit 24, wherein a speed signal V indicative of the real speed of the magnetic head is obtained based upon the slope of the foregoing linear part of the POSN or POSQ signal. Further, the control signals POSN and POSQ are converted to digital signals at an A/D converter 25 and supplied to a microprocessor 26 for coarse positional detection as well as for coarse speed detection. Thereby, the microprocessor 26 counts up the number of peaks of the POSN and POSQ signals with the scanning of the magnetic head and obtains the coarse position of the magnetic head 12c on the magnetic disk 11. Further, the microprocessor 26 produces a digital speed reference signal based upon the coarse position thus obtained and supplies the same to a comparator 27 after conversion to an analog speed reference signal $V_{ref}$ at a D/A converter 26. The comparator 27 is further supplied with the speed signal V detected at the speed detection circuit 24 and produces a control signal indicative of a difference between the signal V and the signal $V_{ref}$. The control signal thus produced is then supplied to the voice coil motor 13 via a switch circuit 28 and a power amplifier 29.

In the foregoing control system, the microprocessor 26 controls the switch circuit 28, when it is detected that the magnetic head has reached in the vicinity of a desired cylinder as a result of the foregoing coarse positional detection, such that the fine control signal FINS from the selection circuit 23 is supplied to the voice coil motor 13 via the power amplifier 29. As a result, a precise positional control of the magnetic head is achieved based upon the peak position of the control signals POSN and POSQ as indicated in FIG. 5.

Figure 7A:
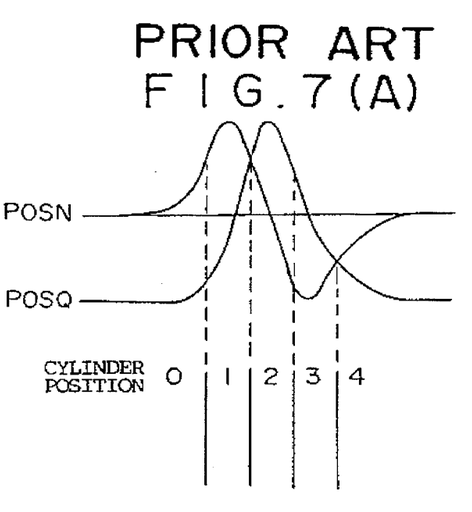
FIGS. 7(A)–7(E) are diagrams showing the operation of the circuit of FIG. 6 as well as the problem associated therewith.
Figure 7B:
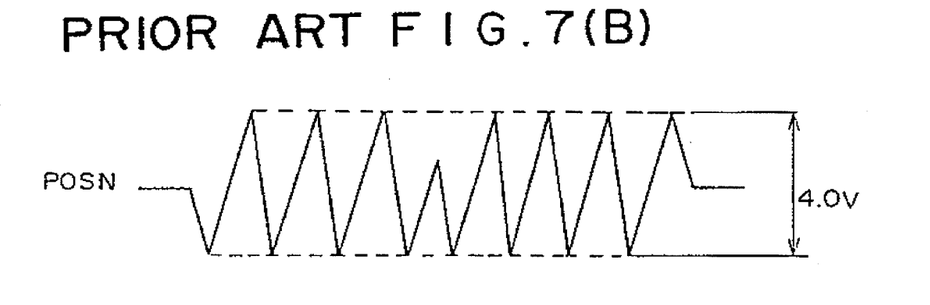
Figure 7C:
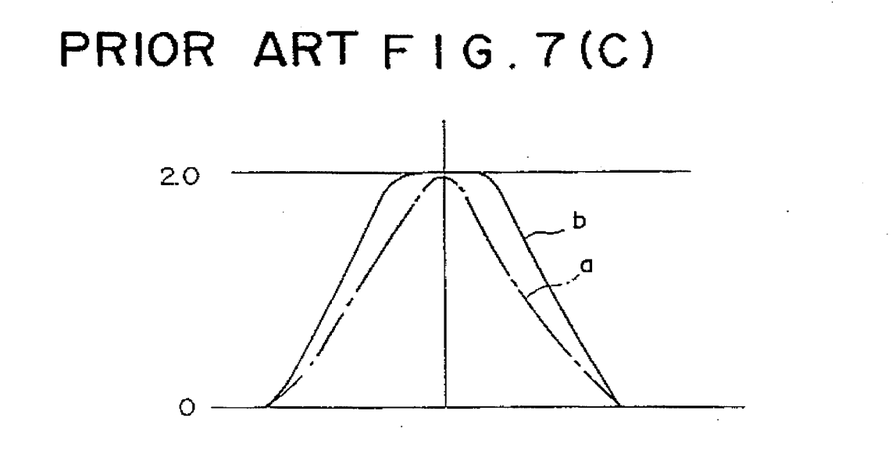
Figure 7D:
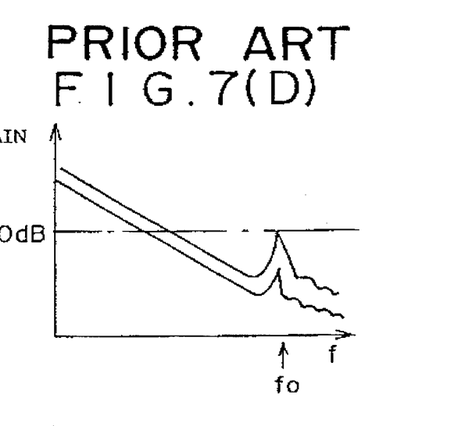

In such a conventional magnetic head control process, however, there arises a problem in that the variation in the width of the cores used in the magnetic head appears conspicuous particularly when the recording density on the magnetic disk has been increased. More specifically, the shape of the positional control signals POSN and POSQ shown in FIG. 7(A) tends to be modified as indicated in FIG. 7(C) depending upon the apparatus used. Thereby, it will be noted that the curves a and b, originally having an analogous shape except for the amplitude, which differs depending upon the core width, have mutually different slopes because of the fact that the AGC circuit 21 has fixed the peak level of the signals uniformly at a common level. It should be noted that the slope of the control signals POSN and POSQ is related to the sensitivity of the positional detection such that the sensitivity is relatively high in the case of the curve a while the sensitivity is low in the case of the curve b. The reason of the latter is that the signals POSN and POSQ have a flattened shape in the vicinity of the peaks. When the sensitivity of the positional detection is too high, the gain of the servo loop in the control circuit of FIG. 6 increases and there occurs a case wherein the gain exceeds 1 at a mechanical resonant point $f_0$ as indicated in FIG. 7(D) when the magnetic head 12c has achieved a seek operation shown in FIG. 7(B). It should be noted that FIG. 7(B) shows the change of the POSN signal that occurs in response to the movement of the magnetic head 12c from the inner periphery of the magnetic disk 11 to the outer periphery of the magnetic disk 12. In FIG. 7(B), it will be noted that the peak-peak value of the signal is held at 4 volts as a result of the gain control achieved by the AGC amplifier 21 of FIG. 6. When the gain of the servo loop exceeds the level 1, the servo system causes an oscillation.

Figure 7E:
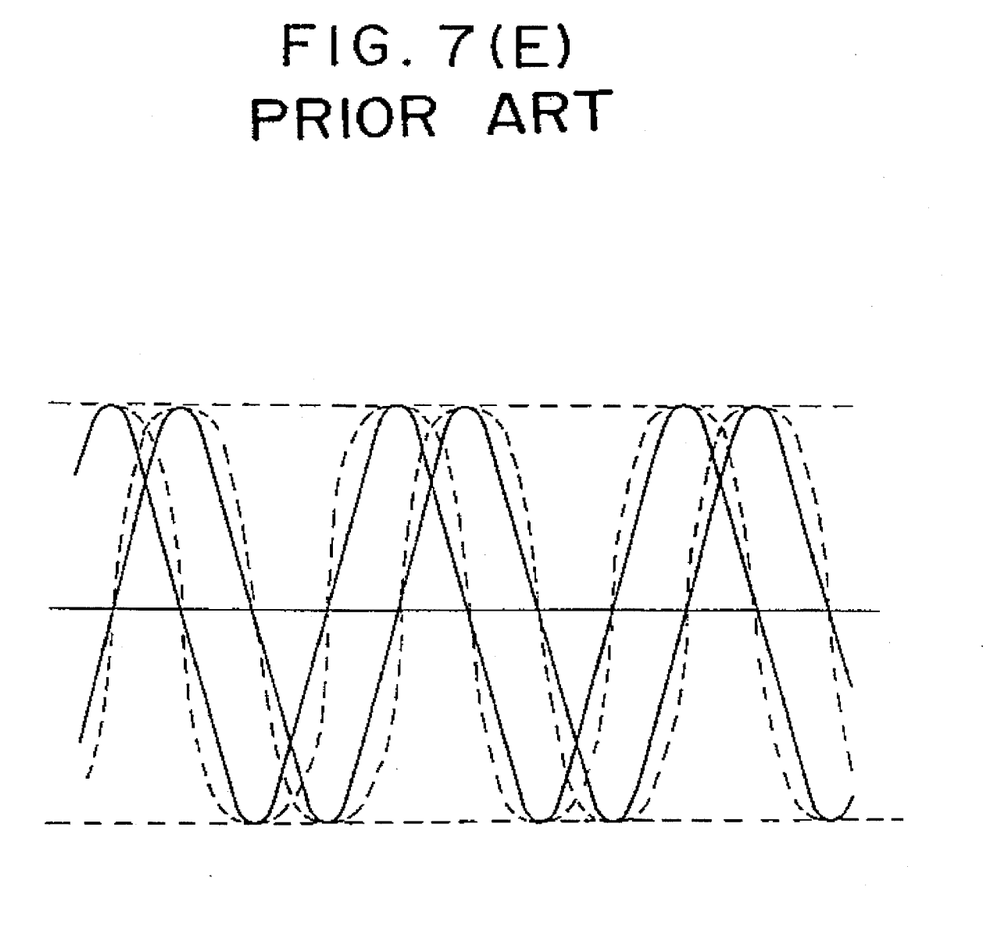

On the other hand, when the sensitivity of the control signals POSN and POSQ is low as indicated in FIG. 7(C) by a curve b, the gain of the servo loop decreases and the deviation of the magnetic head during the positional control increases. Further, the variation in the shape of the control signal as indicated in FIG. 7(C) tends to cause a deviation in the magnetic head speed V that is obtained by the circuit 24 with respect to the actual speed. Thereby, there is a substantial risk that one obtains an erroneous head position in the coarse positional control process achieved in response to the output of the comparator 27. FIG. 7(E) shows such a deviation in the detected magnetic head speed caused by the distortion of the shape of the control signals POSN and POSQ, wherein it will be noted that the linear part of the curve represented by a broken line has a slope that is different from the slope of the curve represented by a continuous line.

Thus, when there occurs an excessive error in the coarse positional control, there occurs problems such that the fine control of the magnetic head position thereafter becomes impossible or the access time of the magnetic disk storage device varies device by device.

DISCLOSURE OF THE INVENTION

Accordingly, it is a general object of the present invention to provide an novel and useful disk storage device and a head position control method for such a disk storage device, wherein the foregoing problems are eliminated.

Another and more specific object of the present invention is to provide a magnetic disk storage device and a positional control method of a magnetic head in such a magnetic disk storage device, wherein the positional control of the magnetic head is substantially immune to the variation in the core width of the magnetic head.

Another object of the present invention is to provide a disk storage device, comprising: at least one disk provided rotatably on a single rotational axis and having a principal surface carrying thereon a plurality of recording tracks that are formed concentric with respect to said single rotational axis; revolving means for revolving said disk; a head provided so as to scan said principal surface of said disk in a generally radial direction thereof, said head reproducing a servo control signal in response to a servo pattern formed on said principal surface in correspondence to said plurality of recording tracks; rotary means provided rotatable about a rotary axis, said rotary means carrying said head and moving the same along said principal surface of said disk generally in said radial direction; driving means for driving said rotary means; amplification means supplied with said servo signal reproduced at said head for amplifying the same with a predetermined gain; signal processing means for extracting first and second positional control signals, each having a phase that is offset with respect to the phase of the other positional control signal by 90 degrees, from said servo control signal; level detection means for detecting a head position at which said first and second positional control signals have simultaneously an identical level and further for detecting said level of said first and second positional control signals at said head position; gain control means for controlling said predetermined gain of said amplification means such that said level detected by said level detection means takes a predetermined value; and head position control means for controlling said driving means in response to a combination of said first and second positional control signals such that said first and second heads are located on respective predetermined recording tracks, based upon said head position in which said first and second positional control signals have the same level simultaneously. According to the present invention, the cross point of the first positional control signal (POSN) and the second positional control signal (POSQ) is included in the linear interval of the respective positional control signals, and one can minimize the effect of variation of the positional control signal on the head positional control even when there is a variation in the width of the core of the magnetic head, by setting the level of a particular point included in the linear interval of the positional control signal at a predetermined level, rather than by setting the peak level of the positional control signals as practiced conventionally. Thereby, one can achieve a precise head positioning control while using a simple construction of the system of the head positioning control.

Other objects and further features of the present invention will become apparent from the following detailed description when read in conjunction with the attached drawings.

BEST MODE FOR CARRYING OUT THE INVENTION

First, the principle of the magnetic disk device of the present invention will be described with reference to FIGS. 8(A) and 8(B).

Figure 8A:
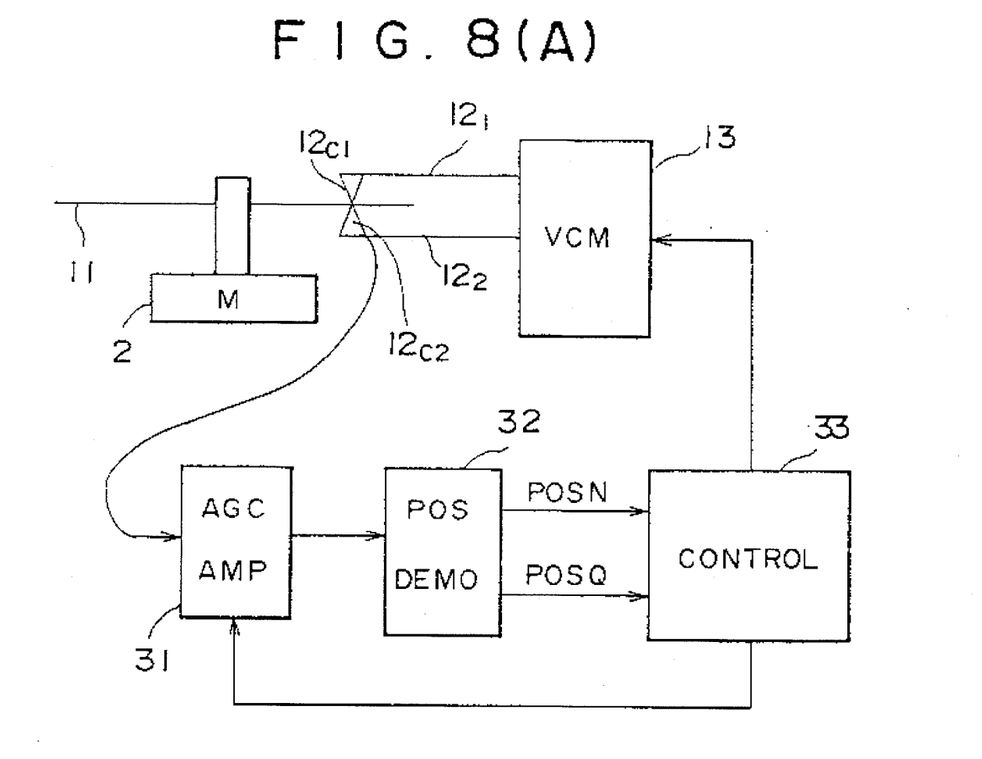
FIGS. 8(A) and 8(B) are diagrams showing the principle of the present invention.

Referring to FIG. 8(A), the magnetic disk device includes a magnetic disk 11 that is driven by a motor 2 similarly to the conventional magnetic disk devices, wherein it will be noted that the magnetic disk 11 has upper and lower principal surfaces on which a plurality of concentric tracks $11b$ are formed (see FIG. 1). On the upper and lower major surfaces of the magnetic disk 11, cylinders are defined for recording information signals, wherein the information signals are recorded and reproduced via magnetic heads $12c_1$ and $12c_2$ that are carried at a distal end of an upper arm $12_1$ and a lower arm $12_2$ that correspond to the arm 12. On the lower principal surface, a servo signal pattern for head positioning control is formed similarly to FIG. 3 described already, and the servo control signal is reproduced by the magnetic head $12c_2$ that is used exclusively for reading. On the other hand, the information signals are recorded on the upper principal surface of the magnetic disk via the magnetic head $12c_1$. As already described, the upper arm $12_1$ and the lower arm $12_2$ are driven simultaneously and unitarily by the voice coil motor 13, and the upper magnetic head $12_1$ tracks the cylinder on the upper principal surface of the magnetic disk properly when the lower magnetic head $12_2$ is controlled to track the servo signal pattern recorded on the lower principal surface of the magnetic disk 11.

The servo control signal reproduced by the magnetic head $12c_2$ has a waveform similar to the one described with reference to FIG. 4 and is supplied to a demodulator circuit 32 corresponding to the circuit 22 of FIG. 6, after a gain adjustment at an AGC amplifier 31. The demodulator circuit 32 produces positional control signals POSN and POSQ that are mutually offset in phase by 90 degrees as shown in FIG. 7(A) or FIG. 8(B) and supplies the same to a control circuit 33. The control circuit 33 controls the gain of the AGC amplifier 31 based upon the level of the positional control signals POSN and POSQ and determines the position of the magnetic head $12_2$ based upon the combination of the signals POSN and POSQ. Further, the control circuit 33 controls the voice coil motor 13 such that the magnetic head $12_2$ is located on a desired cylinder.

Figure 8B:
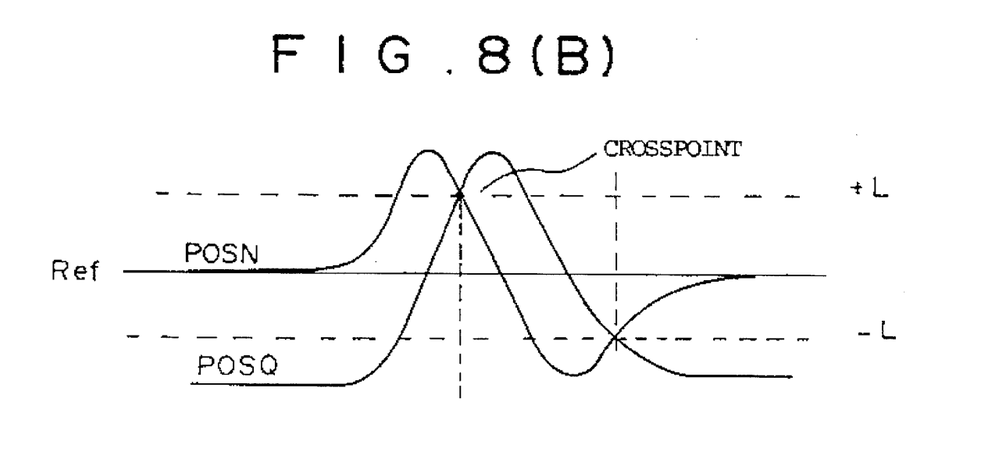

FIG. 8(A) shows the essential feature of the present invention, wherein FIG. 8(B) shows the gain control of the AGC amplifier 31 conducted under control of the control circuit 33.

Referring to FIG. 8(B), there are four cylinders included in one period of the positional control signals POSN and POSQ similarly to the conventional devices, wherein the head position is determined by urging the level of the cross point of the signals POSN and POSQ at the levels +L and −L respectively. Thereby, the determination of the head position is achieved accurately from the linear intervals of the signals POSN and POSQ while using a simple construction for the head positioning system.

Hereinafter, the present invention will be described with respect to the embodiments.

Figure 9:
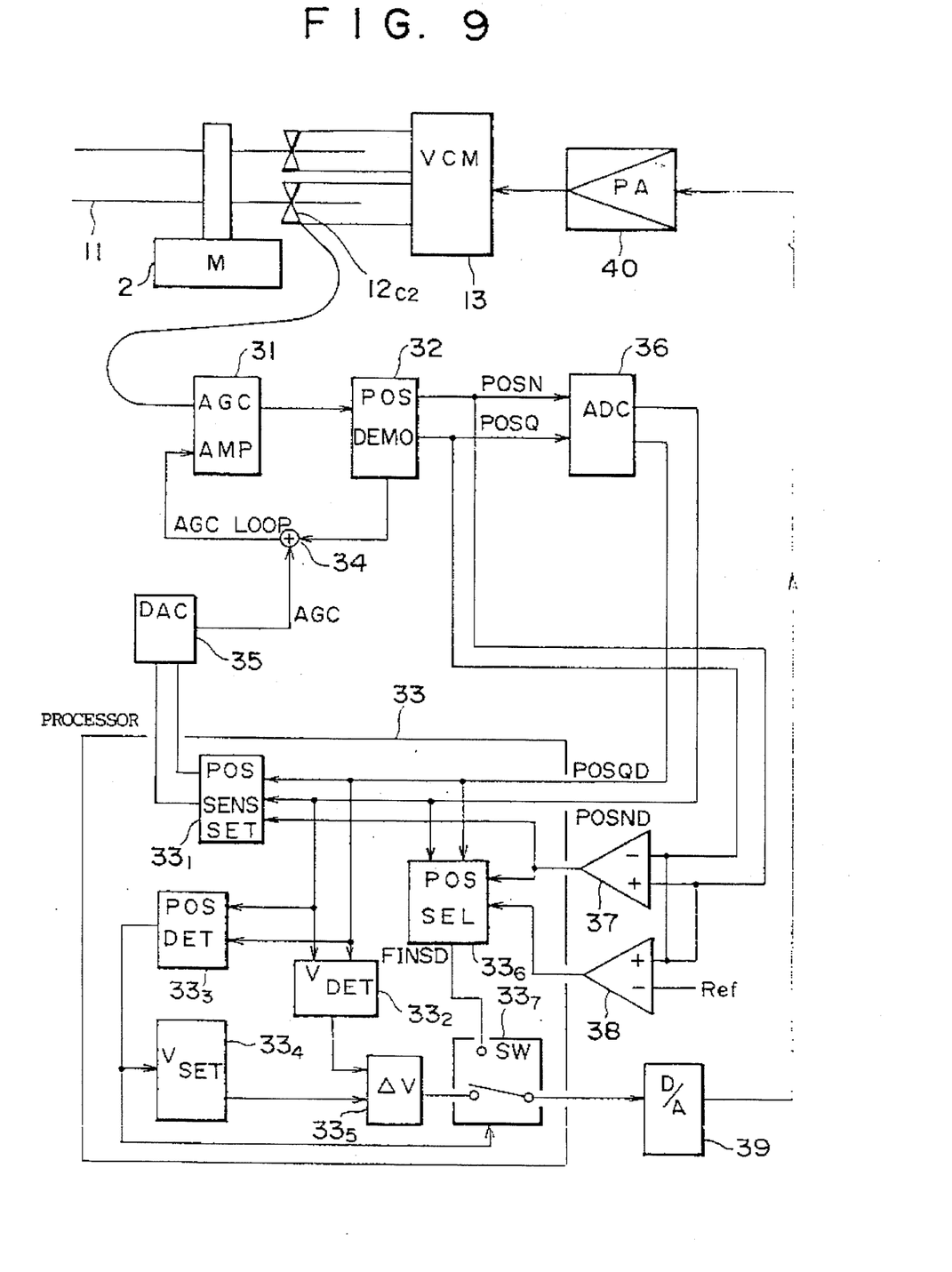
FIG. 9 is a block diagram showing the construction of a magnetic disk device according to an embodiment of the present invention.

FIG. 9 is a diagram for explaining an embodiment of the present invention. In FIG. 9, those parts described previously are designated by the same reference numerals and the description will be omitted.

Referring to FIG. 9, the demodulator circuit 32 demodulates the positional control signals POSN and POSQ based upon the reproduced servo control signals supplied from the AGC amplifier 31. Simultaneously, the circuit 32 produces the AGC signal and feeds it back to the amplifier 31 via an AGC loop that includes a gain control circuit 34. Further, the embodiment of FIG. 9 achieves gain control of the circuit 34 in response to an output signal supplied from a D/A converter 35. The positional control signals POSN and POSQ supplied from the demodulator circuit 32 are supplied to an A/D converter 36 for conversion to digital signals POSND and POSQD respectively, and the digital signals POSND and POSQD thus produced are supplied further to the foregoing control circuit 33 that includes a microprocessor. In addition, the analog positional control signals POSN and POSQ are supplied to a comparator 37 that detects the cross point of the signals POSN and POSQ based upon the difference between the signals POSN and POSQ and produces an output indicative of the cross point to a positional sensitivity preset unit $33_1$ provided in the control circuit 33.

The positional sensitivity preset unit $33_1$ detects the level of the digital positional control signals POSND and POSQD corresponding to the head position wherein the foregoing signals POSN and POSQ intersect with each other. Further, the unit $33_1$ compares the level thus detected with a standard level stored in a memory or register not illustrated and produces output data for controlling the gain of the foregoing AGC loop. The output data is then supplied to the foregoing D/A converter 35 and is used for controlling the gain control circuit 34 of the AGC loop.

The digital positional control signals POSND and POSQD are further supplied to a speed detection unit $33_2$ in the microprocessor 33, wherein the unit $33_2$ differentiates the digital positional control signals to produce a speed detection signal indicative of a moving speed of the magnetic head $12c_2$. Further, the foregoing digital signals POSND and POSQD are supplied to a positional detection unit $33_3$ provided in the same microprocessor 33, wherein the unit $33_3$ counts up the digital signals POSND and POSQD to evaluate the position of the magnetic head $12c_2$ on the magnetic disk 11. Further, the data thus detected by the positional detection unit $33_3$ and indicative of the position of the magnetic head is transferred to a speed setup unit $33_4$ that is also provided in the microprocessor 33, wherein the speed setup unit $33_4$ produces preset speed data indicative of a programmed speed for the detected magnetic head position, based upon a position versus speed relationship that is stored in a memory not illustrated in the drawings. Further, the output data of the speed setup unit $33_4$ and the speed detection unit $33_2$ are supplied to a speed difference detection unit $33_5$ wherein speed difference data indicative of a difference between the programmed speed and the actual speed of the magnetic head is produced.

In the microprocessor 33, a positional preset unit $33_6$ is provided such that the unit $33_6$ is supplied with the foregoing digital positional control signals POSQD and POSND and produces a digital fine adjustment signal FINSD that represents a difference between the level of the linear part of the analog positional control signal POSN or POSQ and the level of the foregoing cross point. Thereby, the output of the foregoing positional preset unit $33_6$ and the output of the foregoing speed difference detection unit $33_5$ are supplied to a data selector $33_7$. Thereby, the data selector $33_7$ is controlled by the output of the positional detection unit $33_3$ and supplies the output data of the speed difference detection unit $33_5$ to the power amplifier 40 that drives the voice coil motor, after conversion to an analog signal in a D/A converter 39, when in the coarse control mode. On the other hand, the positional detection unit $33_3$ controls the data selector $33_7$, when it is discriminated that the magnetic head $12c_2$ has reached in the vicinity of a desired cylinder, such that the digital fine adjustment signal FINSD of the positional preset unit $33_6$ is supplied to the power amplifier via the foregoing D/A converter 39.

Figure 10:
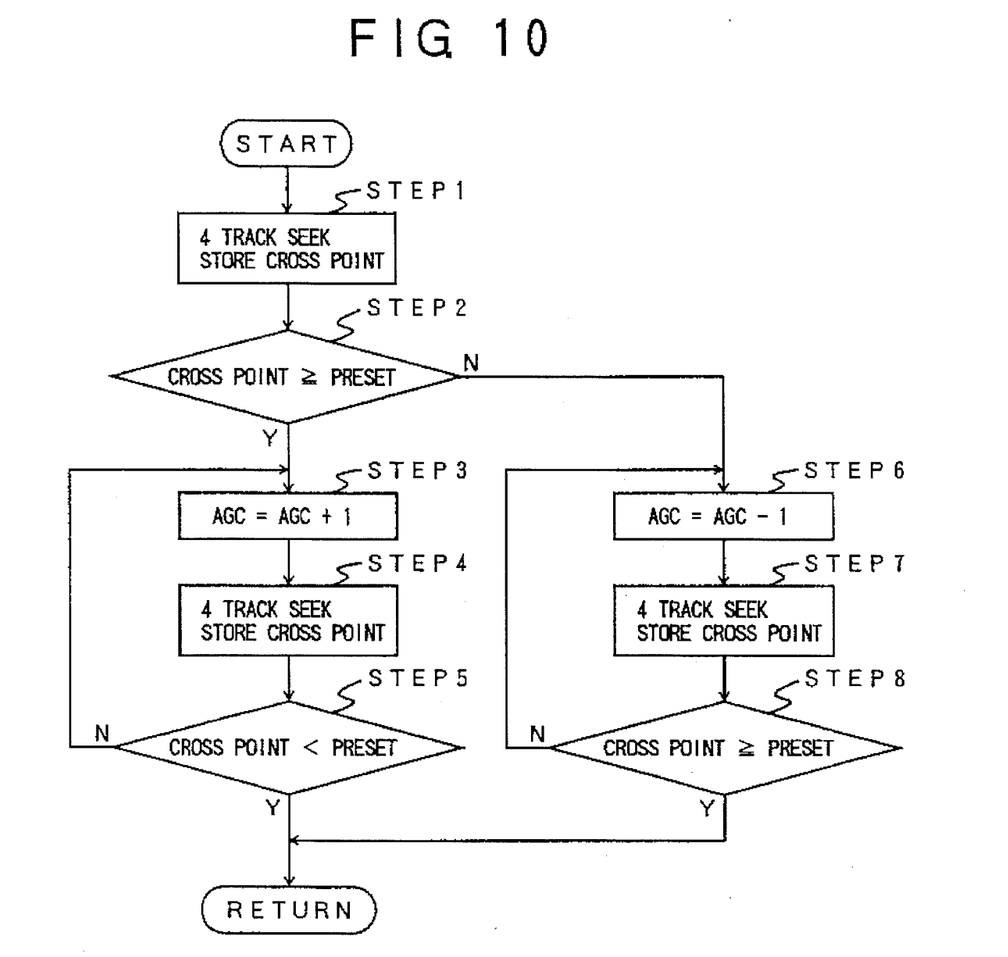
FIG. 10 is a flowchart showing the operation of the device of FIG. 9.

FIG. 10 shows a flowchart for explaining the operation of the microprocessor 33, particularly of the operation of the gain adjustment of the AGC loop that is conducted in the positional sensitivity preset unit $33_1$.

Referring to FIG. 10, the positional detection unit $33_3$ reads the digital positional control signals POSND and POSQD for four consecutive cylinders in a step 1, and the seek operation is activated thereby. As indicated in FIG. 7(A), the positional control signals POSN and POSD have a sinusoidal waveform and includes four recording tracks corresponding to the foregoing four cylinders. Thus, by using the digital positional control signals POSND and POSQD of the foregoing four cylinders, one can obtain the cross point of the analog signals POSN and POSQ accurately.

In the step 1, the foregoing cross point is detected further based upon the output signal of the comparator 37, and the positional sensitivity setup unit $33_1$ detects the level of the digital positional control signals POSND and POSQD corresponding to the cross point thus detected. Further, the levels of the digital positional control signal POSND and POSQD are compared, in a step 2, with a preset value stored in a memory (not illustrated) that cooperates with the positional sensitivity preset unit $33_1$, and the value of the gain control data of the AGC loop is increased by one unit in a step 3 when the result of the comparison indicates that the level of the cross point exceeds the preset value. Further, the operation of the step 1 is repeated in a step 4. It should be noted that the aforementioned gain control data is the data supplied to the gain control circuit 14 via the D/A converter 35 and the gain of the AGC amplifier 31 decreases with increasing value of the gain control data. Further, a discrimination similar to that of the step 2 is conducted in a step 5. When the level of the cross point is larger than the foregoing predetermined preset level, the loop from the step 3 to the step 5 is repeated. Thereby, the gain of the AGC amplifier 31 is decreased gradually. On the other hand, when it is discriminated in the step 2 that the level of the cross point has not reached the preset value, the gain control data of the AGC loop is decreased by one unit in a step 6 and the seek operation of the step 1 is repeated in a step 7. Further, a discrimination is made in a step 8 whether or not the level of the cross point has exceeded a predetermined preset value or not in a step 8. Further, by repeating the steps 6–8, the gain of the AGC amplifier 31 is increased gradually until the foregoing positional control signals POSN and POSQ have the levels coincident to the foregoing preset level.

Figure 11A:
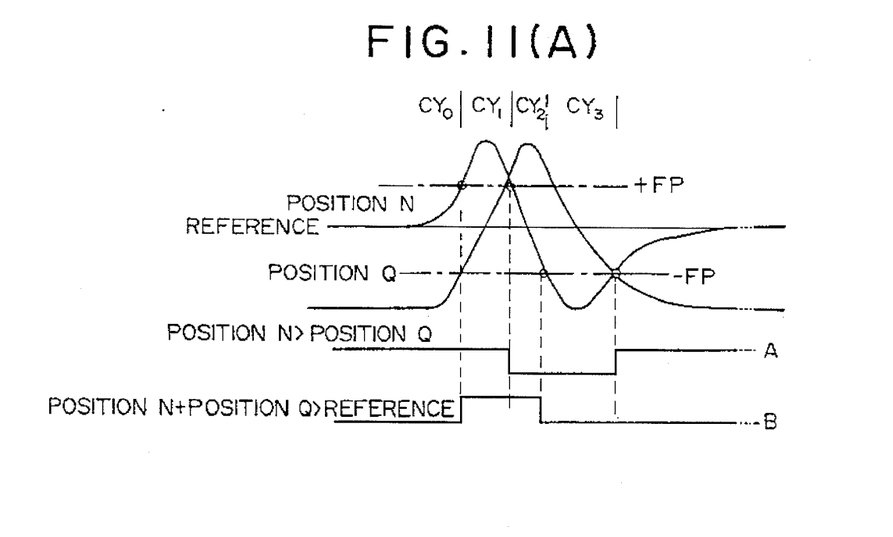
FIGS. 11(A) and 11(B) are diagrams showing the operation of the device of FIG. 9.
Figure 11B:
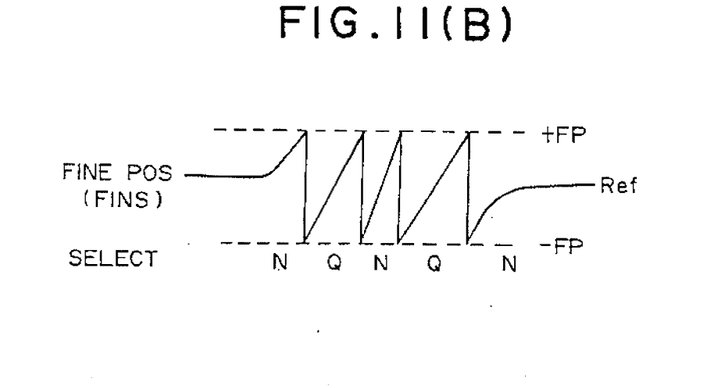

FIGS. 11(A) and 11(B) explain the seek operation conducted for four consecutive cylinders $CY_0$–$CY_3$ shown in FIG. 9, wherein there exists a boundary of the cylinders in correspondence to the position wherein the level of the positional control signals POSN and POSQ coincides with the level of the foregoing cross point. In the illustrated example, the positional control signals POSN and POSQ takes the value of +FP and –FP respectively (+FP, –FP) when the magnetic head $12c_2$ is located on the boundary between the cylinder $CY_0$ and the cylinder $CY_1$. On the other hand, when the magnetic head $12c_2$ is located on the boundary between the cylinder $CY_1$ and the $CY_2$, the positional control signals POSN and POSQ take the same value of +FP (+FP, +FP), wherein +FP and −FP represent the foregoing preset value. Similarly, the signal POSQ takes the value +FP and the signal POSN takes the value −FP (−FP, +FP) when the magnetic head $12c_2$ is located on the boundary between the cylinder $CY_2$ and the cylinder $CY_3$. Further, when the magnetic head $12c_2$ is located on the boundary between the cylinder $CY_3$ and a cylinder immediately outside of the cylinder $CY_3$, both of the signals POSN and POSQ takes the value −FP (−FP, −FP). Thus, by seeking the four consecutive cylinders $CY_0$ −$CY_3$ and by obtaining the combination of the positional control signals POSN and POSQ, it is possible to detect on what cylinder of the foregoing four cylinders the magnetic head is located. Thereby, an accurate control of the magnetic head position becomes possible. It should be noted that such a positional detection utilizes the linear part of the positional control signal. In FIG. 11(A), the output of the comparator 37 of FIG. 9 is designated as signal A, while the output of the comparator 38 is designated as signal B. The signal A experiences a transition in correspondence to the cross point of the signals POSN and POSQ and one can detect the boundary between the cylinder $CY_1$ and the cylinder $CY_2$ as well as the boundary between the cylinder $CY_3$ and the cylinder adjacent to the cylinder $CY_3$ based upon the transition of the signal A. Thereby, one obtains the signal B by supplying the level of such a cross point to the comparator 38 as a reference signal ref. The boundary of the cylinder $CY_0$ and the cylinder $CY_1$ as well as the boundary between the cylinder $CY_2$ and the cylinder $CY_3$ are obtained based upon the transition of the signal B.

FIG. 11(B) shows the fine adjustment of the magnetic head position associated with such a seek operation. It will be noted that the digital fine control signal FINSD changes linearly between the level −FP and +FP, wherein −FP and +FP represent the predetermined preset level set by the AGC amplifier 31.

Figure 12:
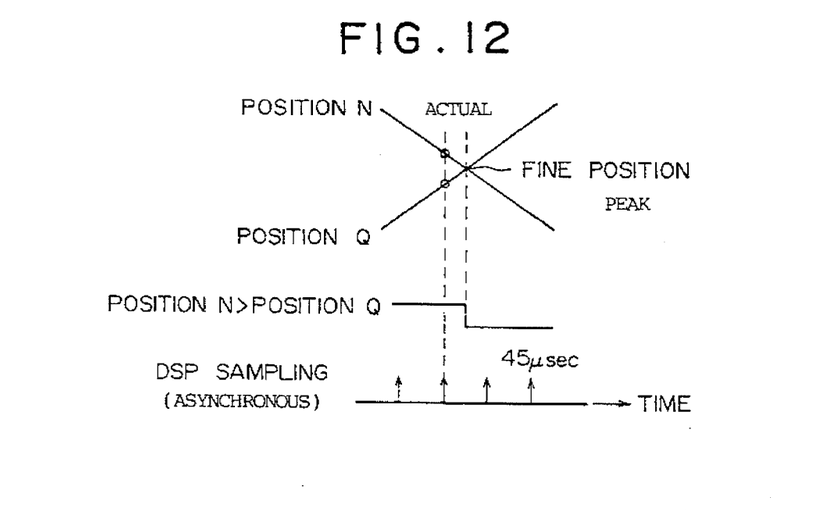
FIG. 12 is a diagram showing another embodiment of the present invention.

FIG. 12 shows a second embodiment of the present invention.

Referring to FIG. 12, the present embodiment employs, contrary to the previous embodiment that uses the analog comparator 37 for the cross point detection of the positional control signals POSN and POSQ, a sampling of the signals POSN and POSQ that is conducted in the microprocessor 33 for detection of the foregoing cross point. Thereby, the detection of the cross point is achieved by averaging the sampled values of the POSN and POSQ signals. The sampling may be achieved with an interval of 45 usec, and the level of the cross point is obtained by employing an extrapolation according to an equation $$L=(|POSN-REF|+|POSQ-REF|)/2.$$

According to the foregoing process, one can extrapolate the cross point even when the cross point is not sampled directly. Such an interpolation is preferably conducted by using the sampled signals immediately before the cross point in order to avoid non-linearity of the positional control signals POSN and POSQ.

Further, the present invention is not limited to the embodiments described heretofore, but various variations and modifications may be made without departing from the scope of the invention.

INDUSTRIAL APPLICABILITY

According to the present invention, it is possible to achieve an accurate positional control for the magnetic head of hard disk device. Even when there is a variation in the head characteristics, the seek operation is not influenced substantially.

We claim:
1. A disk storage device, comprising:
   at least one disk provided rotatably on a single rotational axis and having a principal surface carrying thereon a plurality of recording tracks;
   revolving means for revolving said disk;
   a head provided so as to scan said principal surface of said disk in a generally radial direction thereof, said head reproducing a servo control signal in response to a servo pattern that is recorded on said principal surface in correspondence to said plurality of recording tracks;
   swing arm means provided rotatably about a rotary axis, said swing arm means carrying said head and moving said head along said principal surface of said disk generally in said radial direction;
   driving means for driving said swing arm means;
   amplification means supplied with said servo signal reproduced at said head for amplifying said servo signal with a predetermined gain;
   first positional control signal generating means for generating a first positional control signal from said servo signal supplied from said amplification means;
   second positional control signal generating means for generating a second positional control signal from said servo signal supplied from said amplification means, such that said second positional control signal has a phase offset by 90 degrees with respect to said first positional control signal;
   sampling means for sampling a level of said first and second positional control signals with a predetermined sampling interval, said sampling means producing first and second digital positional control signals respectively in response to said first and second positional control signals;
   head position control means for controlling a head position of said head by energizing said driving means in response to a combination of said first and second digital positional control signals;
   averaging means for averaging said first and second digital positional control signals in the vicinity of a cross point where said first and second positional control signals cross with each other, to produce average data; and
   gain control means for controlling the gain of said amplification means such that an absolute value of the level of said cross point, represented by said average data in the vicinity of said cross point, is set to a predetermined value.

2. A disk storage device as claimed in claim 1, further comprising a second head for recording and/or reproducing information signals on and from another principal surface of said disk; second rotary means held rotatable commonly about said rotary axis for carrying said second head such that said second head moves along said another principal surface generally in a radial direction thereof; wherein said driving means drives said rotary means and said second rotary means simultaneously.

3. A disk storage device as claimed in claim 1, wherein said level detection means detects the level of the cross point of said first and second positional control signals for both positive and negative cross points having positive and negative levels.

4. A disk storage device as claimed in claim 1, wherein said head position control means comprises coarse position determination means for determining a coarse position of said head by counting up the number of peaks of said first and second positional control signals; head speed preset means for specifying a head speed of said head based upon the coarse position of said head obtained by said coarse position determination means; head speed detection means for detecting an actual head speed based upon said first and second positional control signals; and head speed control means for controlling said head drive means based upon a difference between said head speed specified by said head speed preset means and the actual head speed obtained at said head speed detection means, such that said difference decreases.

5. A method for controlling a position of a head on a disk, comprising the steps of:

reproducing a servo control signal from a servo pattern formed on said disk for controlling the position of said head;

producing first and second positional control signals having respective phases offset from each other by 90 degrees, from said servo control signal;

sampling said first and second positional control signals repetitively at a predetermined sampling interval to produce first and second sample data respectively indicating levels of said first and second positional control signals;

averaging said first and second sample data to produce average data as a level of a cross point of said first and second positional control signals;

setting an absolute level of said cross point represented by said average data in the vicinity of said cross point to a predetermined level by setting a gain of an amplifier used for amplifying said first and second positional control signals; and controlling a position of said head, based upon a combination of the level of said first and second positional control signals amplified by said amplifier with said gain.

6. A head positional signal producing circuit, comprising:

extraction means for extracting a first positional control signal and a second positional control signal having respective phases offset by 90 degrees with each other, from a servo signal pattern formed on a disk for positional control of a head, said extraction means including amplification means for amplifying said first and second positional control signals with a predetermined gain;

level setting means for setting the absolute value of said first and second positional control signals to a predetermined level at a cross point wherein said first and second positional control signals cross with each other, said level setting means including:

sampling means for sampling the level of said first and second positional control signals at a predetermined sampling interval, said sampling means producing first and second sample data respectively indicating the levels of said first and second positional control signals thus sampled; and averaging means for averaging said first and second sample data, said averaging means producing average data as the data representing the level of said cross point, said level setting means further setting said predetermined gain of said amplification means such that the level of said cross point, represented by said average data in the vicinity of said cross point, is set to a predetermined level; and means for producing a head control signal in response to a combination of said first and second positional control signals amplified by said amplification means with said predetermined gain.

7. A disk storage device, comprising:

at least one disk provided rotatably on a single rotational axis and having a principal surface carrying thereon a plurality of recording tracks;

revolving means for revolving said disk;

a head provided so as to scan said principal surface of said disk in a generally radial direction thereof, said head reproducing a servo control signal in response to a servo pattern that is recorded on said principal surface in correspondence to said plurality of recording tracks;

a carriage carrying said head, said carriage moving said head along said principal surface of said disk generally in said radial direction;

driving means for driving said carriage;

amplification means supplied with said servo signal reproduced at said head for amplifying said servo signal with a predetermined gain;

first positional control signal generating means for generating a first positional control signal from said servo signal supplied from said amplification means;

second positional control signal generating means for generating a second positional control signal from said servo signal supplied from said amplification means, such that said second positional control signal has a phase offset by 90 degrees with respect to said first positional control signal;

sampling means for sampling a level of said first and second positional control signals with a predetermined sampling interval, said sampling means producing first and second digital positional control signals respectively in response to said first and second positional control signals;

head position control means for controlling a head position of said head by energizing said driving means in response to a combination of said first and second digital positional control signals;

averaging means for averaging said first and second digital positional control signals in the vicinity of a cross point where said first and second positional control signals cross with each other, to produce average data; and gain control means for controlling the gain of said amplification means such that an absolute value of the level of said cross point, represented by said average data in the vicinity of said cross point, is set to a predetermined value.

* * * * *

UNITED STATES PATENT AND TRADEMARK OFFICE
CERTIFICATE OF CORRECTION

PATENT NO. : 5,541,785
DATED : Jul. 30, 1996
INVENTOR(S) : Sasamoto, et al.

It is certified that error appears in the above-indentified patent and that said Letters Patent is hereby corrected as shown below:

On the Title Page:

Assignee, Item [73]: before "Japan" insert --Kawasaki,--.

To [22]: delete "Filed: Sep. 27, 1993" and insert --PCT Filed Jan. 29, 1993--

Add --[86] PCT No.: PCT/JP93/00110

§371 Date: September 27, 1993

§102(e) Date: September 27, 1993

[87] PCT Pub. No.: WO93/15505

PCT Pub. Date: August 5, 1993--.

Column 4, line 45, delete "an" and insert --a--.

UNITED STATES PATENT AND TRADEMARK OFFICE
CERTIFICATE OF CORRECTION

PATENT NO. : 5,541,785
DATED : Jul. 30, 1996
INVENTOR(S) : Sasamoto, et al.

It is certified that error appears in the above-indentified patent and that said Letters Patent is hereby corrected as shown below:

Column 6, line 51, delete "FIG. 8(B)" and insert --FIG. 8(A)--.

Column 9, line 48, delete "usec" and insert --$\mu$sec--.

Signed and Sealed this

Eighth Day of July, 1997

Attest:

BRUCE LEHMAN

Attesting Officer

Commissioner of Patents and Trademarks